United States Patent
Engelmann et al.

(10) Patent No.: US 8,095,295 B2
(45) Date of Patent: Jan. 10, 2012

(54) DEVICE AND METHOD FOR CONTROLLING FUEL INJECTION

(75) Inventors: Joachim Engelmann, Cham (DE); Joao Graciano, Regensburg (DE); Diego Valero-Bertrand, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 355 days.

(21) Appl. No.: 12/524,294

(22) PCT Filed: Jan. 28, 2008

(86) PCT No.: PCT/EP2008/050969
§ 371 (c)(1),
(2), (4) Date: Jul. 23, 2009

(87) PCT Pub. No.: WO2008/092827
PCT Pub. Date: Aug. 7, 2008

(65) Prior Publication Data
US 2010/0114459 A1    May 6, 2010

(30) Foreign Application Priority Data

Feb. 2, 2007    (DE) .......................... 10 2007 005 361

(51) Int. Cl.
*F02B 3/12*    (2006.01)
(52) U.S. Cl. .................. 701/105; 123/299; 123/490
(58) Field of Classification Search .................. 701/105; 123/299, 490
See application file for complete search history.

(56) References Cited

U.S. PATENT DOCUMENTS

| | | | | |
|---|---|---|---|---|
| 3,702,601 A | * | 11/1972 | Gordon et al. ................ | 123/490 |
| 4,387,429 A | * | 6/1983 | Yamauchi et al. ............ | 701/105 |
| 4,688,536 A | * | 8/1987 | Mitsuyasu et al. ............ | 123/490 |
| 5,130,598 A | * | 7/1992 | Verheyen et al. ........ | 310/316.03 |
| 5,402,760 A | * | 4/1995 | Takeuchi et al. ............... | 123/300 |
| 5,479,910 A | * | 1/1996 | Bauer et al. ............... | 123/179.17 |
| 6,044,823 A | * | 4/2000 | Watanabe ..................... | 123/490 |
| 6,564,771 B2 | | 5/2003 | Rueger et al. | |
| 6,862,515 B2 | * | 3/2005 | Vogt .............................. | 701/104 |
| 6,865,473 B2 | | 3/2005 | Moessinger et al. | |
| 7,944,117 B2 | * | 5/2011 | Ripoll et al. .................. | 310/317 |
| 2002/0046731 A1 | | 4/2002 | Rueger et al. | |
| 2004/0030488 A1 | | 2/2004 | Moessinger et al. | |
| 2005/0229898 A1 | | 10/2005 | Kikutani | |

FOREIGN PATENT DOCUMENTS

| | | |
|---|---|---|
| DE | 10033343 A1 | 1/2002 |
| DE | 10041448 A1 | 3/2002 |
| DE | 10114039 A1 | 9/2002 |
| EP | 1497544 A1 | 1/2005 |

OTHER PUBLICATIONS

German Office Action, German application No. 10 2007 005 361.6-26, 3 pages, Jul. 30, 2007.
International PCT Search Report, PCT/EP2008/050969, 11 pages, Mailed May 27, 2008.

* cited by examiner

*Primary Examiner* — Erick Solis
(74) *Attorney, Agent, or Firm* — King & Spalding L.L.P.

(57) ABSTRACT

In a method for controlling fuel injection by means of injectors in a multicylinder internal combustion engine, the injectors are controlled sequentially according to control data for opening and closing in injection processes, wherein for each cylinder in an operating cycle a certain injection segment is defined, during which injection is possible. For the cylinders, a plurality of injection processes are performed per injection segment, the duration and temporal position for these injection processes are defined in the operating cycle, and in a conflict correction step a shift, or suppression, is performed of at least partially overlapping, and therefore conflicting, injection processes.

20 Claims, 6 Drawing Sheets

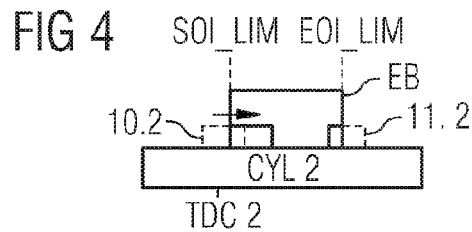
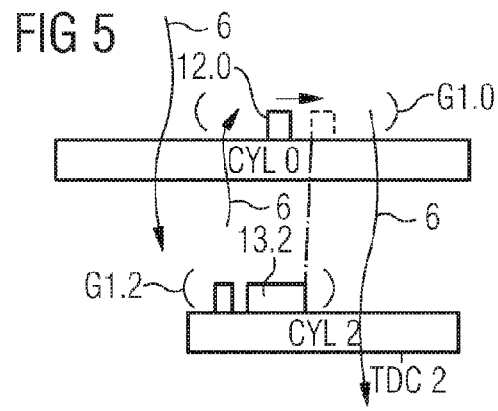
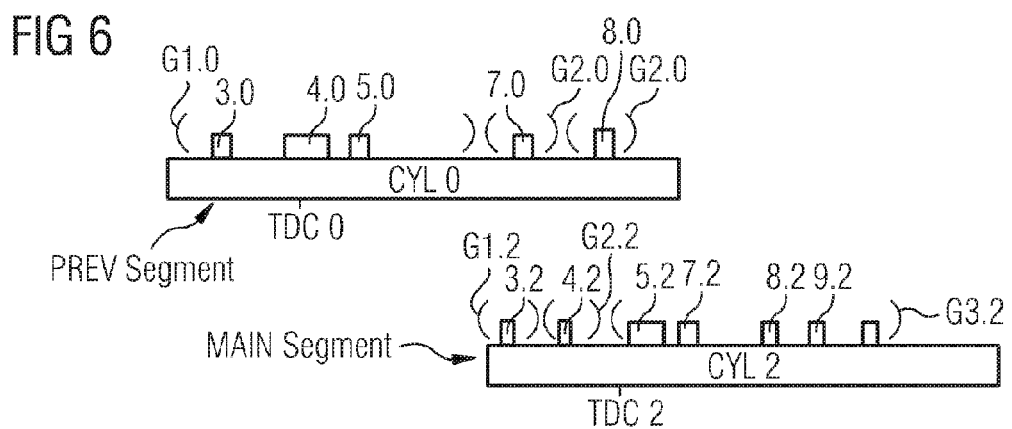
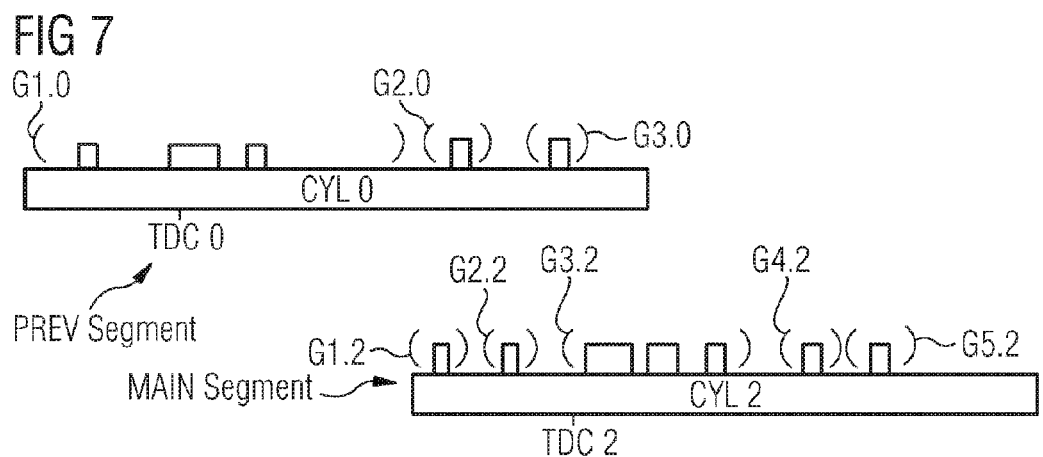

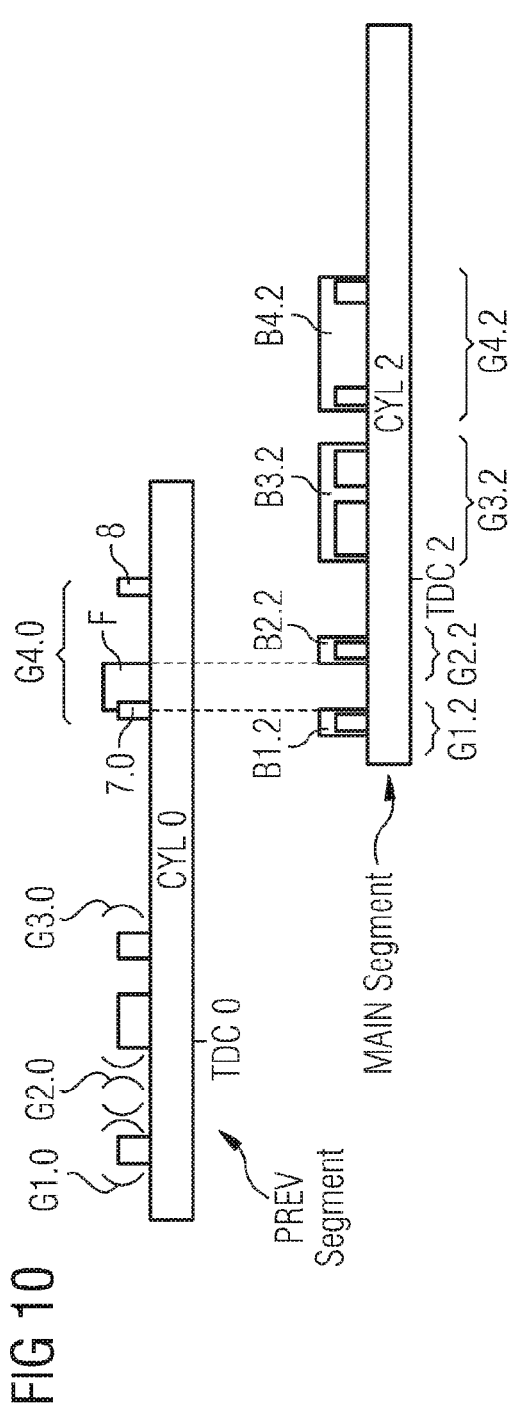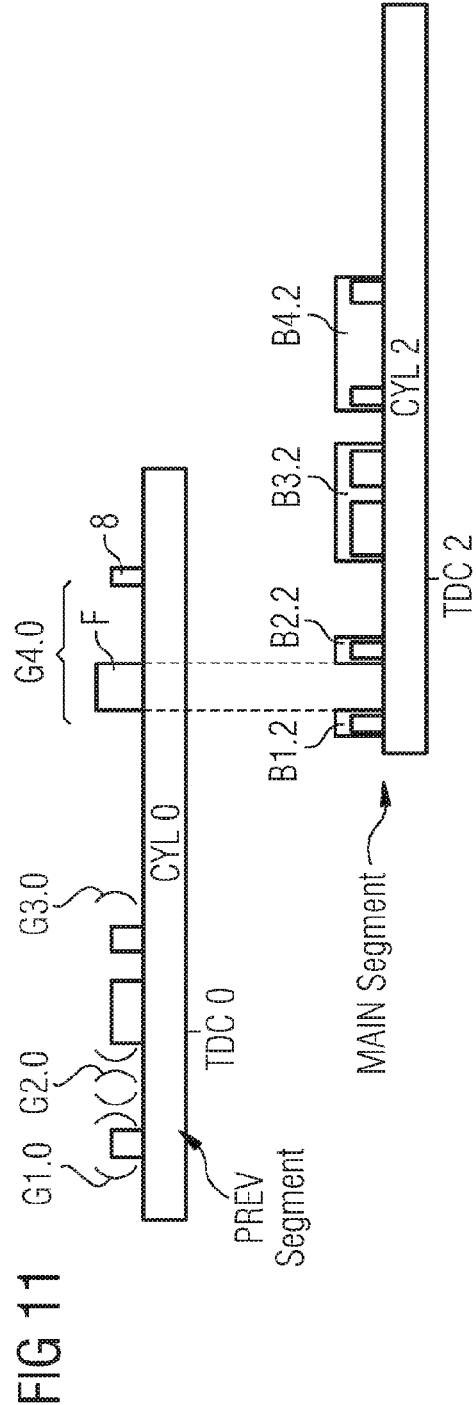

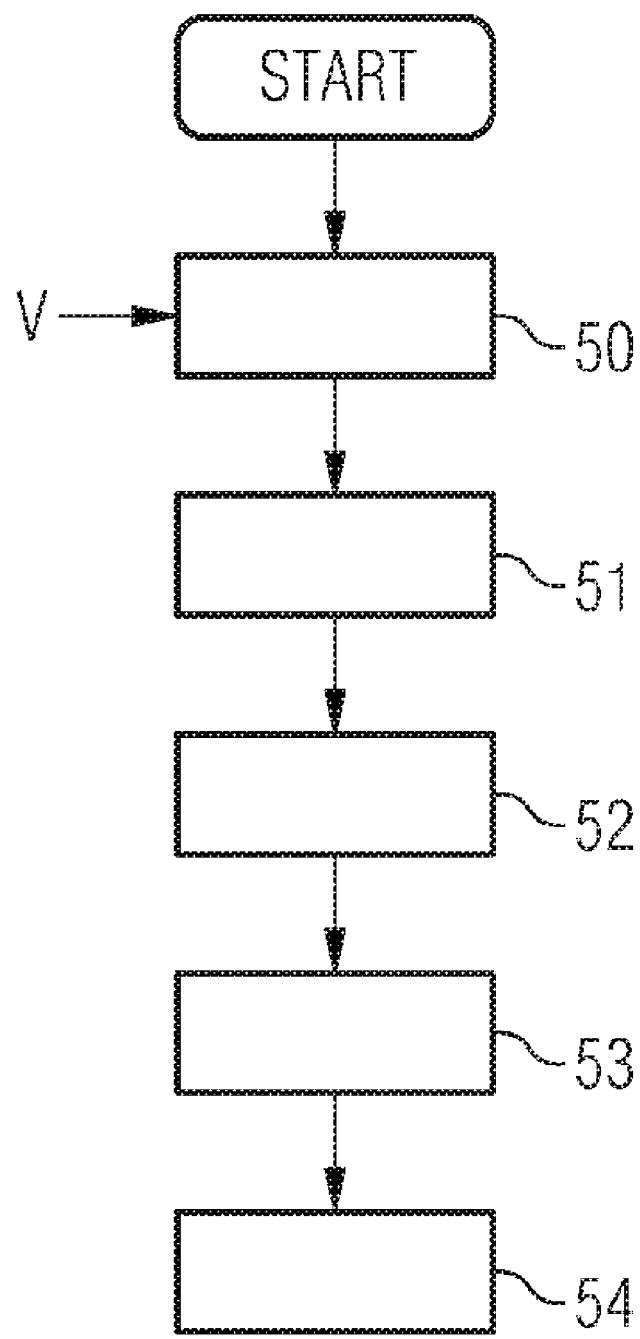

DEVICE AND METHOD FOR CONTROLLING FUEL INJECTION

CROSS-REFERENCE TO RELATED APPLICATIONS

This application is a U.S. National Stage Application of International Application No. PCT/EP2008/050969 filed Jan. 28, 2008, which designates the United States of America, and claims priority to German Application No. 10 2007 005 361.6 filed Feb. 2, 2007, the contents of which are hereby incorporated by reference in their entirety.

TECHNICAL FIELD

The invention relates to a method for controlling fuel injection by means of injectors in a multicylinder internal combustion engine (especially an internal combustion engine with internal mixture preparation), with the injectors being controlled sequentially in accordance with activation data for opening and closing in injection processes, with a specific injection segment in which injections are possible being provided for each cylinder in an operating cycle, with a number of injection processes being executed for the cylinders per injection segment, with duration and temporal position being determined for these injections, with consecutive injection processes for each cylinder being combined into a number of packets of which the injection processes are carried out in direct succession, and with the packets being processed during fuel injection in a sequence in which packets of different cylinders follow directly after one another, as well as to a facility for executing this method for controlling the fuel injection of a multicylinder internal combustion engine with a control device for controlling fuel injectors for metering fuel into a cylinder of the internal combustion engine according to control data and with control data computation means.

BACKGROUND

Because international emission standards are becoming ever more stringent, especially for internal combustion engines of motor vehicles, new fuel injectors with actuation elements or actuators which react very quickly and largely without any delay have been developed for use in internal combustion engines. These are used for example for injection of fuel in diesel or Otto engines. Such actuators include piezoelectric elements, such as piezo actuators. For internal combustion engines with a number of cylinders the actuators of a number of cylinders are grouped into banks and each bank is then activated directly by an activation unit (e.g. output stage).

With a 4-stroke internal combustion engine 720° are needed, i.e. two complete revolutions, to run though all cycles once. To exclude the possibility of an activation unit activating two or more actuators simultaneously, the 720° operating range of the internal combustion engine or crankshaft angular range is divided up for each cylinder into operating windows of equal size. The operating window of a four-cylinder and 1-bank system amounts to 180° per cylinder. The operating window of a cylinder does not begin until the operating window of the previous cylinder ends, which means that the operating windows of the individual cylinders do not overlap and only a single operating window is active. During this active operating window the associated cylinder may be activated in any given way by the activation unit. For motors with a larger number of cylinders (6, 8, 10) the operating window is reduced for a 1-bank system in accordance with the following formula:

Number of banks*720°/number of cylinders

With a 6-cylinder internal combustion engine this would only be 120°.

Because of legal requirements operating windows of 240° or more are needed.

To enable this to be achieved, a number of activation units are needed. Each cylinder bank is given one activation unit in each case.

Thus for example, with a 6-cylinder internal combustion engine, the first, third and fifth cylinders with their actuators can be activated by a first activation unit and cylinders two, four and six by a second activation unit. The operating window of a 6-cylinder internal combustion engine with two banks is consequently 240°.

This represents the injection segment or operating window of the respective cylinder during which fuel can be injected.

It has also proved to be of significance for adherence to the future high demands within the framework of the emission limits that in an individual segment the fuel for each cylinder should be divided up into a number of injections (so-called multiple injections). Of particular importance here is the explicit control of the injection amounts and the injection times of the fuel into the respective cylinder of an internal combustion engine with internal mixture preparation. Pilot injections typically bring about a soft and even increase in the combustion pressure, which for example markedly reduces the classic knocking of a diesel engine. A main injection is used to generate thermal energy, whereby in specific operating areas with a divided main injection, nitrous gas emissions can be greatly reduced. Secondary fuel injections reduce the raw emissions and the particle emissions and make it easier to regenerate possible downstream particle filters. An individual injection process can thus be constructed from pilot, main and secondary injections which are generated during the segment.

A method is known from EP 1497544 for operating a fuel injection system for an internal combustion engine in which at least two piezoelectric injectors are assigned to a bank in each case. The invention monitors whether a time interval in which a first piezo injector is to be charged or discharged overlaps with a time interval in which a second piezo injector is to be charged or discharged. In this case the injections are assigned a priority in each case. In the event of an overlap the injection with the lower priority is then shifted or shortened.

With a multiple injection however the segments and injection processes of a number of cylinders overlap, so that the number of banks would have to be increased, since each bank can only ever activate one injection process. FIG. 2 shows the problem with a schematic diagram of the timing sequence of an activation of a bank with cylinders Cy10 and Cy12. An injector (not shown) of the first cylinder Cy10 is activated so that three part injections 3.0, 4.0, 5.0 are undertaken, which have predetermined temporal positions in relation to the top dead center point TDC0 in the cylinder and predetermined durations (i.e. amount of fuel delivered). After the injections are completed for the first cylinder Cy10, the activation unit brings about the injections 3.2, 4.2, 5.2 for the third cylinder Cy12. The change in the cylinder supplied with injections is represented by an arrow 6. Only when the injections 3.2, 4.2, 5.2 have been processed for cylinder CY12 can there be a switch, as depicted by arrow 6, to activation of the injector or of a further cylinder. In the method of operation in accordance with the prior art it can be clearly seen in FIG. 2 that the injection is possible for a further cylinder after processing of the respective previous cylinder injections and thus during the entire segment.

In addition a few injection concepts occasionally also need a very large segment (i.e. operating window) e.g. in a diesel particle filter regeneration mode a pilot injection is expediently undertaken with a crankshaft angle of −80° and a late secondary injection at 270°. If the same number of banks is retained however, this means a large overlapping of the segments of the individual cylinders, so that now and again an injection can be demanded simultaneously for a number of cylinders.

SUMMARY

According to various embodiments, a method and an apparatus of the type mentioned at the start can be designed such that a more flexible design of the activation of the injectors is possible in a simple manner.

According to an embodiment, a method for controlling fuel injection by means of injectors in a multicylinder internal combustion engine, may comprise the steps of: —activating the injectors sequentially in accordance with activation data for opening and closing in injection processes, with a specific injection segment in which injections are possible being provided for each cylinder in an operating cycle, —executing a number of injection processes for the cylinder per injection segment, —predetermining duration and temporal position in the injection segment for these injection processes, —grouping injection processes for each cylinder into a number of packets of which the respective injection processes are executed directly after each other, and —processing the packets during fuel injection in a sequence in which packets of different cylinders follow directly after each other, wherein a) In a distribution step the injection processes are distributed to the packets without taking into account an undesired simultaneity of the packets of different injection segments or cylinders, and b) In a collision correction step a modification or suppression of at least partly overlapping and thereby colliding injection processes is performed such that the condition will be averted.

According to a further embodiment, the number of packets in the injection segment of the respective cylinder and/or the number of injection processes of each packet is not taken into account in the distribution step and before the collision correction step a normalization step is executed in which the packets are modified so that for each cylinder segment a predetermined number of packets or for each packet a maximum number of all injections is obtained. According to a further embodiment, if need be, packets can be introduced in the normalization step which do not contain any injection process. According to a further embodiment, two consecutive cylinder segments in respect of the control of the fuel injection may always be considered in the steps a) and b). According to a further embodiment, in the distribution step a packet structure which can be produced in the overlap area of the first of the cylinder segments with the second of the cylinder segments, is also used in the second of the cylinder segments in an area in which an overlap with a subsequent cylinder segment is to be expected. According to a further embodiment, in the collision correction step, of two injection processes which overlap in time, that process can be modified or suppressed, especially shifted backwards in time, which lies closer to the end of the segment featuring it. According to a further embodiment, in the collision correction step the time limits of the packets of the second segment can be determined, within a these time limits at least some of the injection processes of the first section provided are determined and these are modified or suppressed. According to a further embodiment, a suppression can be undertaken if the modification needed to avoid a collision causes a change which would exceed a predefined threshold value. According to a further embodiment, the modification may comprise a shift, shortening or splitting into a number of injection processes.

According to another embodiment, a device for controlling the fuel injection of a multicylinder internal combustion engine, may comprise a control device for activating fuel injectors for metering fuel in cylinders of the internal combustion engine in accordance with control data and control data computation means, wherein the control data computation means execute a method as described above during operation.

According to yet another embodiment, a computer program with program code means may execute a method as described above when the program is executed on a computer or computer network.

According to yet another embodiment, a data medium on which a data structure is stored that, after being loaded into a working and/or main memory of a computer or computer network, may executes the method as described above.

According to yet another embodiment, a computer program and product with program code means stored on a machine-readable medium may carry out all steps as described above, if the program is executed on a computer or computer network.

BRIEF DESCRIPTION OF THE DRAWINGS

The invention will be explained in greater detail with reference to exemplary embodiments. The same reference characters in the individual figures in this case designate the same or functionally similar elements or those which correspond to each other as regards their function. The figures show.

DETAILED DESCRIPTION

Figure 1:
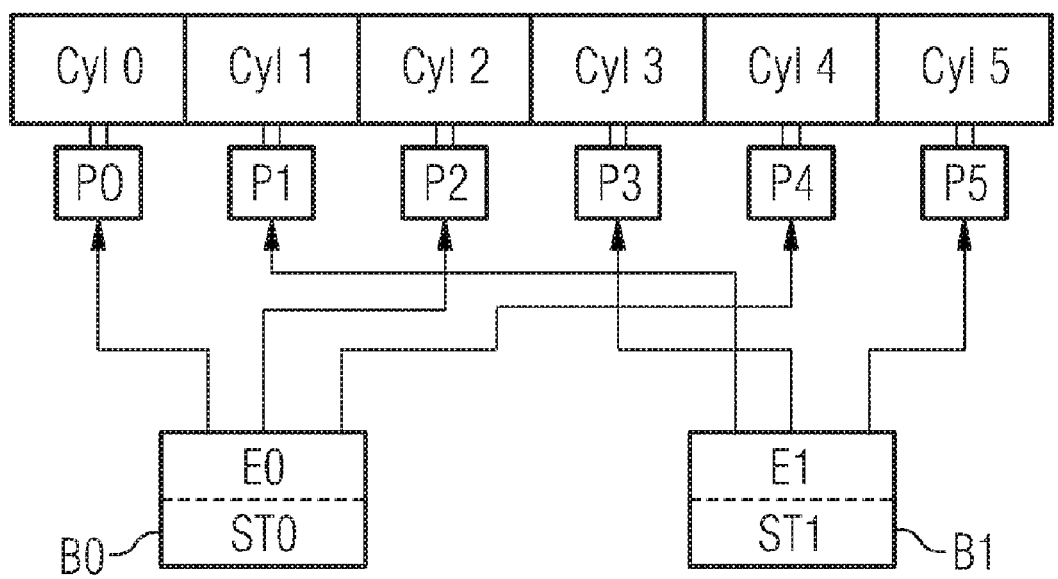
FIG. 1 a schematic diagram of an apparatus for operating actuators.
Figure 2:
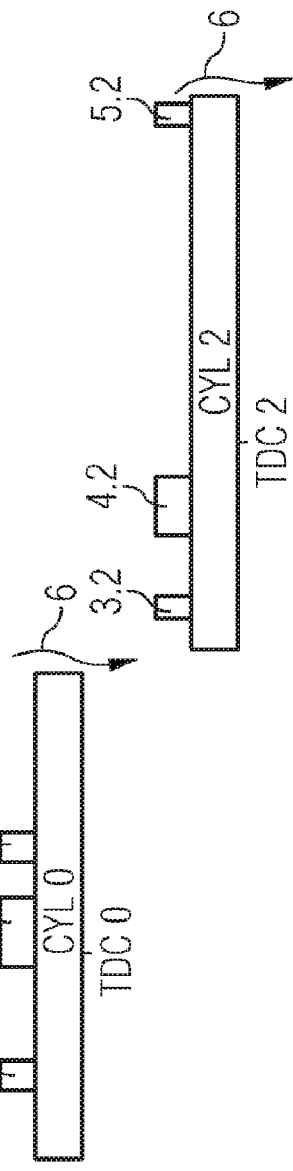
FIG. 2 a diagram for showing the injection concept in accordance with the prior art, FIG. 3 a diagram for showing a packet concept according to various embodiments, FIG. 4 a schematic diagram of a packet FIG. 5 a schematic diagram of packets, FIG. 6 a schematic diagram of packets, FIG. 7 a schematic diagram of packets, FIG. 8 a schematic diagram of packets, FIG. 9 a schematic diagram of packets, FIG. 10 a schematic diagram of packets, FIG. 11 a schematic diagram of packets and FIG. 12 a block diagram for schematically showing an execution sequence of the method according to various embodiments.

As described above, according to various embodiments, a method for controlling the fuel injection by means of injectors for a multicylinder internal combustion engine, with the injectors being activated sequentially for opening and closing in injection processes, and with a number of injection processes being activated for the cylinders per injection segment, for duration and temporal position to be predetermined for these injection processes, for consecutive injection processes for each cylinder to be combined into a number of packets for which the injection processes will be executed in turn, and for fuel injection for the packets of different cylinders to follow directly after each other, may comprise the following steps:

a) In a distribution step the injection processes are distributed to packets, without this operation taking into account an undesired simultaneity of packets of different injection segments or cylinders, and b) In a collision correction step a modification or suppression of at least partly overlapping and thereby colliding injection processes is performed so that the collision is avoided.

According to further embodiments, an apparatus for controlling the fuel injection of a multicylinder internal combustion engine may comprise a control device for controlling fuel injectors for metering fuel into a cylinder of the internal combustion engine in accordance with control data and control data computation means, wherein the control data computation means executes a method of the said type during operation and wherein the control data computation means executes the method just mentioned.

The modification can basically comprise a shift, a shortening and/or dividing-up of a colliding injection process. Where one of these interventions is mentioned here, this is only to be understood as an example.

It may be advantageous if in the distribution step the number of packets produced for the injection segment of the respective cylinder is also not restricted or otherwise taken into consideration and subsequently before the collision correction step a normalization step is executed in which the packets are modified so that for each cylinder segment a predetermined number of packets is produced. Where necessary packets can be inserted if need be which do not contain any injection process, i.e. represent empty packets.

In the method and especially in the collision correction step it may be expedient to always consider a pair of segments following each other in relation to the control of the fuel injection and mutually overlapping, with the term "following each other" being related to those segments which follow after one another in the control. If the injectors of a multicylinder internal combustion engine are thus divided up into banks which are each supplied autonomously with control data (which are naturally tailored to each other in each case) and activate injectors, then with regard to the control of the fuel injection, consecutive segments are those segments of a bank which follow each other in the sequence of this bank.

This naturally applies quite fundamentally provided the injectors and cylinders of the multicylinder internal combustion engine are subdivided into individual banks for control.

In collision correction injection processes which would overlap temporally in the control are shifted or even suppressed entirely. It has been shown that injection processes which occur after the above top dead center point of the cylinder have less significance for the running of an internal combustion engine than injections carried out before the top dead center point. It is therefore advantageous, in collision correction of two temporally overlapping injection processes, to modify or to suppress that process which lies closer in time to the end of the segment featuring it or (in other words) which has a greater temporal distance from the top dead center point of the cylinder assigned to it. Naturally a different prioritization can also be undertaken.

One possibility for achieving this preference for injection processes which are early in relation to the top dead center point of the respective cylinder lies in precisely determining in the collision correction step the time boundaries of the packets in the second segment of the overlapping segment pair and establishing from this simultaneously provided injection processes of the first segment and modifying that process (e.g. shifting it to later times) or suppressing it entirely.

Whether a modification or suppression occurs can be determined from a criterion that only allows a modification when the change caused by it undershoots a specific threshold value and else providing a suppression, i.e. a non-execution of the corresponding injection process.

Where method steps are explained in the description given here, these naturally also apply in a similar way to the apparatus included in the invention in the sense of a functional description of corresponding apparatus elements, such as control devices, processing units etc. Otherwise the description given here is to be understood such that individual features of the versions and embodiments described can be omitted or combined in any order with other described features, method embodiments or elements.

It may be especially advantageous for the method to be realized and executed by a computer program with program code means when the program runs on a computer or computer network. To this end, the computer program with program code means can be stored on a computer-readable data medium. It is also possible to store on the data medium a data structure which executes the method after being loaded into a working and/or main memory of a computer or computer network.

FIG. 1 shows a device for operation or activation of actuators P0 through P5, which as injectors supply cylinders Cy10 through Cy15 with fuel. In this example the actuators P0 through P5 supply a six-cylinder internal combustion engine. In this case two banks B0 through B1 are provided which in each case activate three injectors, in the present case piezoelectric actuators P0, P2, P4 or P1, P3, P5. In the present exemplary embodiment the term "bank" designates the respective output stage E0, E1 and an associated control unit ST0, ST1. Each actuator P0 through P5 is connected electrically to the respective bank B0 or B1 via a control line not shown in any greater detail. The number of cylinders however is not of decisive importance for the realization, nor is the method of operation of the actuators, which can be electromagnetic injectors for example. The activation of the actuators is undertaken here using a two-stage control system. A real-time control device controls the opening and closing of the injectors at specific times. The information as to which actuator is to inject which amount of fuel at which time is predetermined by an application device, with the data or commands computed by the application device being sent to the real-time control device so that this device executes the commands accordingly. The data or commands determined by the application device can also be supplied to the real-time control device at regular intervals so that the latter is supplied with the most up-to-date data and commands without having to continuously accept data or commands. The application and the real-time control device execute in accordance with an application or real-time control method, with the terms being able to be used interchangeably here.

If an actuator P0 is activated by the control line by the first bank B0, then it is charged or discharged. Alternately the charge state of the actuator P0 can also be monitored and if necessary maintained by recharging. Depending on the electrical voltage applied to the actuator P0, the current fed to the actuator P0, the amount of charge transferred and/or the time until discharging, the metered fuel amount is varied from zero up to a maximum value. The charging process/state is merely an example for pre-determining the amount of fuel to be metered in an injection. It is important however that each output stage can only activate one actuator/one injector at a given point in time.

Figure 3:
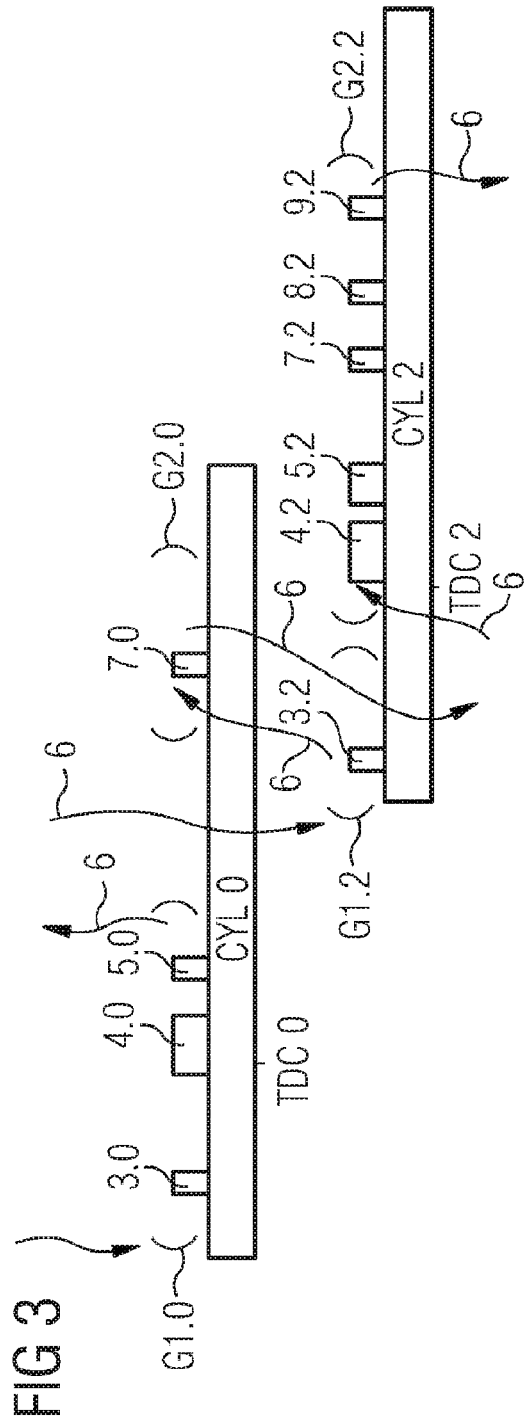

FIG. 3 shows a schematic diagram of the temporal sequence of an activation for injection in accordance with the method of operation according to various embodiments. It can be clearly seen that the injections for the respective cylinders are grouped together per segment into groups representing a number of packets and the consecutive packets do not belong to the same cylinder. Starting with the cylinder Cy10, the packet G.10 is processed with three part injections 3.0, 4.0, 5.0 by activations of the actuator P0. Subsequently the switch is made in accordance with the arrow 6 for activating a packet G1.2 which (here) contains an injection 3.2 for the cylinder Cy12. Then in accordance with the arrow 6 a switch is made to a point G2.0 of the cylinder. Then the injection 7.0 is undertaken before, once again interposing packets not shown in any greater detail, a switch is made to a packet G2.2 of the cylinder Cy12. As regards the cylinder Cy12, the packet G2.2 is executed with the injections 4.2, 5.2, 7.2, 8.2, 9.2 before subsequently a switch is made again to another packet. Thus switches are made between individual packets and thereby the individual cylinders.

The injections of a packet of a cylinder are always processed entirely before the switch is made to a further packet of which the injections now and again relate to another cylinder, and this is processed. For executing the method the injections are grouped into packets so that the injections are no longer processed cylinder-by-cylinder but packet-by-packet. In this regard it should be noted how the limits of the packets are set.

Different methods are considered for this which group the injections for the individual cylinders into packets in real time and optimize the distribution of the injections between the packets. In order to achieve a robust method, a method is preferably used which sets the limits of the packets dynamically. Within one packet the respective output stage always and exclusively supplies the respective injector with activation signals.

This method computes and optimizes the grouping of the injections into packets in order to execute an injection concept in overlapping segments (injection windows).

Naturally in special cases a packet can also correspond to a segment, i.e. contain all the injections of a cylinder operating cycle. Advantageously the number of the packets and the switchover sequence is vehicle- or system-specific and is not changed during the run time of the method.

The creation of the packets and the definition of the injections and thereby the actuator activation occurs in one embodiment on the basis of so-called pulse packet structure computation. In this case a pulse value of one (active pulse) stands for a state in which the actuator is activated for dispensing fuel and a pulse value of zero designates a state in which the injector is closed. The pulses are thus a description of actuator activity causing the injector opening and to this extent a pulse is a specification for an injector opening and thereby for an injection process. For reasons of the robustness of the method, in one variant the number of injection processes is defined per packet and is not changed during the run time of the method. The following applies for each pulse: If it is activated in one packet, an injection is activated, else it is suppressed.

The method described below can be combined with correction methods, e.g. if injection processes are displaced in time by the method for example. FIG. 4 shows a diagram of an area EB which is defined by a beginning SOI_LIM and an end EOI_LIM. Injections are allowed in this area. If it emerges after the method below has run that the injection 10.2 (e.g. because of a shift) is to start before the beginning SOI_LIM, the method shifts the start of the injection 10.2 to the beginning SOI_LIM. In the event of the injection 11.2 lasting beyond the end EOI_LIM, the end of the injection 11.2 will be set to the end EOI_LIM, e.g. by being aborted prematurely. The area can for example be the timing section in which injections can be undertaken for a cylinder; but is can also be defined especially by the limits of a packet.

FIG. 5 shows an example in which in injections of various cylinders would overlap in different packets. As can be seen the temporally earlier packet G1.2 of the cylinder Cy12 is first processed, although the injection 12.0 of the packet G1.0 of the cylinder Cy10 overlaps with the second injection 13.2 of the packet G1.2 of the cylinders Cy12. In such a case the injection 12.0 of the packet G1.0 will be shifted temporally until after the injection 13.2, so that the injection 12.0 begins immediately after the end of the injection 13.2 of the packet G1.2 of the cylinder Cy12.

At the beginning of the method the position and the duration of the packets are already predetermined and the assignment of injections to packets, the limits of the packets and the activation/deactivation of injection processes are determined. Depending on the speed of computation or the engine speed, the method can be carried out once or twice per segment.

In this case the computation of the assignment of the injections to the packets, the packet limits and the deactivation or the activation of pulses is carried out in three steps (also referred to as subprocesses). In a distribution step, a standardization step and a collision correction step the aim is particularly to form the packets so that for injections in areas in which two segments overlap, a number are grouped into packets. For distinguishing between segments a main segment (MAIN) and a directly previous segment (PREV) will be defined for the description. Let the main segment designate a segment for which the method with the computed data (start of the injection, duration of the injection) is withheld as a default, and let the previous segment be the immediately previous segment of the same bank. For improved presentation the grouping of the injections into packets is shown in the figures by the round brackets, naturally not the exact position of the limits of the packets.

Each packet will be fully processed before the switch to a further packet is made. I.e. the injections of one packet will be executed without interruption one after the other. Then it is the turn of the injections of the next packet. The injections of one packet always relate to one cylinder, but do not absolutely contain all injections for the current injection segment of this cylinder. In other words, the injections of a cylinder segment can be distributed to different packets which will not necessarily be processed directly consecutively by the associated control unit.

The division of the injections into the packets now occurs, as already mentioned, in three submodules (methods or facilities) which form the packets iteratively.

In the first submodule (distribution step) the provisional grouping of the pulses into packets is undertaken. This submodule autonomously optimizes the distribution of the pulses into packets with, at the start of injection SOI, the cylinders involved, Cy10 and Cy12, or their overlapping segments being taken into account. This involves overlapping segments in the example. Their injections will first be divided up into groups or packets. This is shown in FIG. 6. The figure shows in segment PREV and in segment MAIN the distribution of the injections into groups or packets, with in segment PREV of the cylinder Cy10 the injections being arranged in three packets G1.0, G1.2, G1.3, with three injections 3.0, 4.0, 5.0 being present in G1.0 and only one injection 7.0 or 8.0 respectively in G2.0 and G3.0. Furthermore in the segment MAIN of the cylinder Cy12 the injections are divided up into three packets G1.2, G2.2 and G3.2, with in G1.2 one (3.2) in G2.2 one (4.2) and in G3.2 five injections being present. The division into packets is such in this case that no temporal overlapping of the groups occurs and at the same time as many injections as possible lie in each group.

Furthermore in the first submodule the structure of the previous segment is partly copied into the following segment, since it is to be expected that collisions of injections of the MAIN segment with injections of their subsequent segment lie in a similar way to the collisions of the PREV segment with the MAIN segment. Precise knowledge of the method is naturally not available at this time. Thus the grouping of the segment in this section MAIN in the overlapping section to the next (not shown) segment is undertaken in accordance with the structure of the PREV segment. Assuming that the collision in the overlapping area between MAIN segment and its (not yet in relation to injections) defined subsequent segment (e.g. cylinder Cy14) is lying exactly between PREV and MAIN, the MAIN segment in the overlap area to cylinder Cy14 is given the same structure as the PREV segment in the overlap area to MAIN. In this way two packets G4.2 and G5.2 are split off from the group G5.2 of FIG. 6. This has the effect, see FIG. 7, of two packets being split off from the packet G3.2 of the cylinder Cy12.

Figure 8:
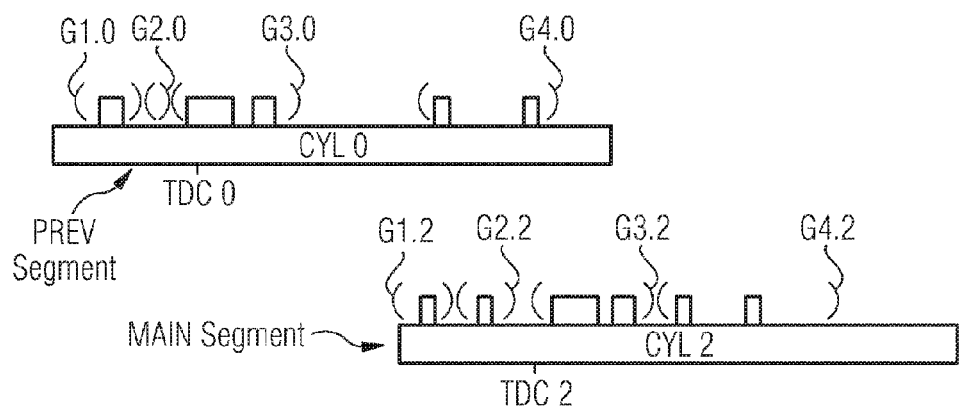

In a further sub module, the second, the number of packets per segment and/or the number of injections per packet is limited and adjusted (standardization step). As can be seen in FIG. 8, the number of injections per packet is set to two here. Naturally this can be defined individually for vehicle, internal combustion engine or system. In addition the number of packets in all segments is fixed at four for example, which leads in segment PREV to an empty packet G2.0 being introduced in which no injection occurs however. There are now four packets available for the segments, each containing a maximum of two injections.

Figure 9:
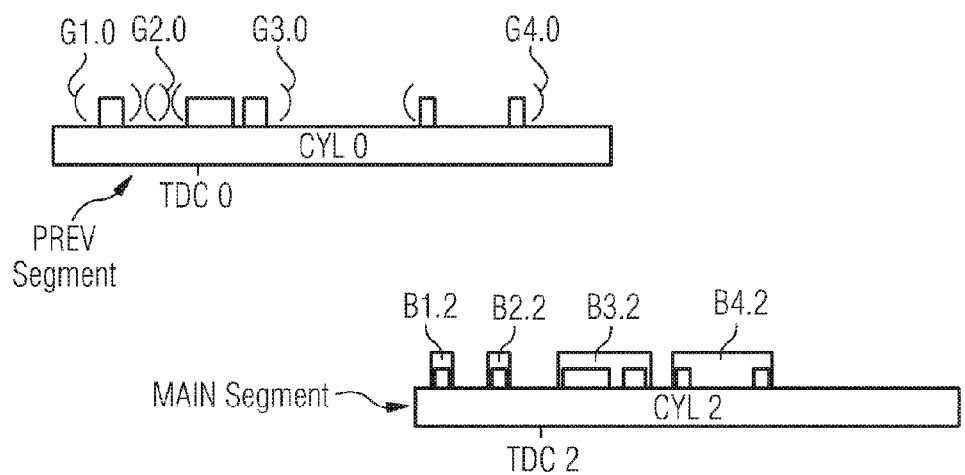

In the next sub module, the third, packet management and injection correction is undertaken. The packet limits are adapted to the injection limits. To this end in segment MAIN the limits of the packets are set in each case to the limits of the first or last injections provided within them. This can be seen in FIG. 9. The limits of the packets are defined by the boxes with a grey background, which are now designated B1.2, B2.2, B3.2 and B4.2. In these cases a packet begins with the beginning of the first injection of the packet and ends with the end of the last injection of the packet. In the event of only one injection being present per packet, the limit of the packet is given by the duration of the individual injection. Only the definition of the packet limits makes collision checking possible.

In the next step of this sub module (the actual collision correction), the limits of the packets are corrected in respect of overlapping. In such cases it is assumed that injections in the first half of a segment are more important than in the second half of the segment. Therefore the PREV segment is modified in the overlap area. The limits of the packets of the segment PREV are corrected so that they fit into the gaps between the packets of the segment MAIN which remain unchanged. Thus no injection in the first half of the segment MAIN is changed because of an overlap of packets of the segments PREV and MAIN. For packets without injections the limit is set to the maximum injection area.

The correction is shown by way of example in FIG. 10. In this figure an overlap (i.e. a collision) between the packets G1.2 and G2.2 with the injection 7.0 of the packet G4.0 is established. Thus this injection for cylinder Cy10 is shifted to later such that no collision of the packets G1.2 ad G2.2 defined by the limits B1.2 and B2.2 is present. The injection concerned then lies fully in window F that is defined by the period of time between the packets G1.2 and G2.2. If however the shift required were too great (beyond a threshold value) such an injection would be deactivated. This alternative is shown in FIG. 11. In this figure the injection 7.0 is now missing in packet G4.0 of the cylinder Cy10.

The method thus features a number of steps that are executed: Computation and grouping of injections into packets (distribution), normalization (adjusting the number) and collision correction, e.g. by shifting injections. This can also take account of requirements, according to which certain injections are not of interest if they were shifted too greatly and should thus rather be omitted.

FIG. 12 is a schematic of the sequence of the method. After the start of the application method the grouping or distribution of injections into packets is undertaken in a block 50, with predetermined variables (e.g. the duration of the injections or pulses and the position of the injection or pulses) being accessed. In a block 51 the possible number of packets and number of injections per packet are adjusted and limited and in block 52 the collisions are corrected, e.g. by shifting injections. At the end of block 52 the data is made available for activation purposes via an interface and a control device (block 53) performs the activation of the actuators (block 54).

The method can be advantageously implemented as a computer program. In such cases the subprocesses could be arranged as subprogram modules. In such cases the method described above can also be integrated advantageously into an application-specific integrated circuit (ASIC). Furthermore the network can execute the method in one of its embodiments. Furthermore according to various embodiments, a computer program has program code means to execute the method in one of its embodiments when the program is executed on a computer or computer network. In particular the program code means can be stored on a computer-readable data medium. According to another embodiment, a data medium has a data structure stored which, after it is loaded into a working and/or main memory of a computer or computer network, can execute the method in one of its embodiments. According to yet another embodiment, a computer program product with program code means stored on a machine-readable medium may execute the method in one of its embodiments if the program is executed on a computer or computer network. In this case the term computer program product is to be understood as a marketable product. It can basically be available in any form, for example on paper or a computer-readable medium, and can especially be distributed over a data transmission network.

What is claimed is:

1. A method for controlling fuel injection by means of injectors in a multicylinder internal combustion engine, with the method comprising the steps of:

activating the injectors sequentially in accordance with activation data for opening and closing in injection processes, with a specific injection segment in which injections are possible being provided for each cylinder in an operating cycle, executing a number of injection processes for the cylinder per injection segment, predetermining duration and temporal position in the injection segment for these injection processes, grouping injection processes for each cylinder into a number of packets of which the respective injection processes are executed directly after each other, and processing the packets during fuel injection in a sequence in which packets of different cylinders follow directly after each other, wherein a) In a distribution step the injection processes are distributed to the packets without taking into account an undesired simultaneity of the packets of different injection segments or cylinders, and b) In a collision correction step a modification or suppression of at least partly overlapping and thereby colliding injection processes is performed such that the condition will be averted.

2. The method according to claim 1, wherein at least one of the number of packets in the injection segment of the respective cylinder and the number of injection processes of each packet is not taken into account in the distribution step and before the collision correction step a normalization step is executed in which the packets are modified so that for each cylinder segment a predetermined number of packets or for each packet a maximum number of all injections is obtained.

3. The method according to claim 2, wherein, if need be, packets are introduced in the normalization step which do not contain any injection process.

4. The method according to claim 1, wherein two consecutive cylinder segments in respect of the control of the fuel injection are always considered in the steps a) and b).

5. The method according to claim 4, wherein in the distribution step a packet structure which is produced in the overlap area of the first of the cylinder segments with the second of the cylinder segments, is also used in the second of the cylinder segments in an area in which an overlap with a subsequent cylinder segment is to be expected.

6. The method according to claim 1, wherein in the collision correction step, of two injection processes which overlap in time, that process is modified or suppressed which lies closer to the end of the segment featuring it.

7. The method according to claim 6, wherein in the collision correction step the time limits of the packets of the second segment are determined, within a these time limits at least some of the injection processes of the first section provided are determined and these are modified or suppressed.

8. The method according to claim 7, wherein a suppression is undertaken if the modification needed to avoid a collision causes a change which would exceed a predefined threshold value.

9. The method according to claim 1, wherein the modification comprises a shift, shortening or splitting into a number of injection processes.

10. A device for controlling the fuel injection of a multicylinder internal combustion engine, comprising a control device for activating fuel injectors for metering fuel in cylinders of the internal combustion engine in accordance with control data and control data computation means, wherein the control data computation means is operable to execute a method as claimed in claim 1 during operation.

11. A computer readable data medium on which a instructions are stored that, after being loaded into a working and/or main memory of a computer or computer network, the computer or computer network is operable to execute the method as claimed in claim 1.

12. The method according to claim 1, wherein in the collision correction step, of two injection processes which overlap in time, that process is shifted backwards in time, which lies closer to the end of the segment featuring it.

13. The method as claimed in claim 12, characterized in that in the collision correction step the time limits of the packets of the second segment are determined, within a these time limits at least some of the injection processes of the first section provided are determined and these are modified or suppressed.

14. The method as claimed in claim 13, characterized in that a suppression is undertaken if the modification needed to avoid a collision causes a change which would exceed a predefined threshold value.

15. A system for controlling fuel injection by means of injectors in a multicylinder internal combustion engine, comprising a control device for:

activating the injectors sequentially in accordance with activation data for opening and closing in injection processes, with a specific injection segment in which injections are possible being provided for each cylinder in an operating cycle, executing a number of injection processes for the cylinder per injection segment, predetermining duration and temporal position in the injection segment for these injection processes, grouping injection processes for each cylinder into a number of packets of which the respective injection processes are executed directly after each other, and processing the packets during fuel injection in a sequence in which packets of different cylinders follow directly after each other, and a control data computation means operable to:

a) distribute, in a distribution step, the injection processes to the packets without taking into account an undesired simultaneity of the packets of different injection segments or cylinders, and b) to perform, in a collision correction step, a modification or suppression of at least partly overlapping and thereby colliding injection processes such that the condition will be averted.

16. The system according to claim 15, wherein at least one of the number of packets in the injection segment of the respective cylinder and the number of injection processes of each packet is not taken into account in the distribution step and before the collision correction step a normalization step is executed in which the packets are modified so that for each cylinder segment a predetermined number of packets or for each packet a maximum number of all injections is obtained.

17. The system according to claim 16, wherein, if need be, packets are introduced in the normalization step which do not contain any injection process.

18. The system according to claim 15, wherein two consecutive cylinder segments in respect of the control of the fuel injection are always considered in the steps a) and b).

19. The system according to claim 18, wherein in the distribution step a packet structure which is produced in the overlap area of the first of the cylinder segments with the second of the cylinder segments, is also used in the second of the cylinder segments in an area in which an overlap with a subsequent cylinder segment is to be expected.

20. The method according to claim 15, wherein in the collision correction step, of two injection processes which overlap in time, that process is modified or suppressed which lies closer to the end of the segment featuring it.

* * * * *